United States Patent [19]

Numakura et al.

[11] Patent Number: 5,357,349
[45] Date of Patent: Oct. 18, 1994

[54] TONAL CONVERSION METHOD FOR A PICTURE

[75] Inventors: Takashi Numakura; Iwao Numakura, both of Tokyo, Japan

[73] Assignee: Yamatoyo & Co., Ltd., Tokyo, Japan

[21] Appl. No.: 790,752

[22] Filed: Nov. 12, 1991

[30] Foreign Application Priority Data

Nov. 9, 1990 [JP] Japan .................. 2-302681

[51] Int. Cl.$^5$ .............................................. H04N 1/40
[52] U.S. Cl. ...................................... 358/456; 358/458
[58] Field of Search ............... 358/298, 456, 455, 458, 358/459, 75, 80, 521, 534

[56] References Cited

U.S. PATENT DOCUMENTS

| | | | |
|---|---|---|---|
| 4,811,108 | 3/1989 | Numakura et al. | 358/456 |
| 4,833,546 | 5/1989 | Numakura et al. | 358/456 |
| 4,924,323 | 5/1990 | Numakura et al. | 358/456 |
| 4,956,718 | 9/1990 | Numakura et al. | 358/456 |
| 5,072,305 | 12/1991 | Numakura et al. | 358/456 |

Primary Examiner—Scott A. Rogers
Attorney, Agent, or Firm—Wenderoth, Lind & Ponack

[57] ABSTRACT

A tone of a picture is converted upon producing a printed picture in a halftone from a photographic original picture in a continuous tone, where density values ($D_{Ho}$ to $D_{So}$) ranging from a highlight part to a shadow part of a reference photographic original picture are converted into corresponding light intensity information values ($X_{Ho}$, $X_{So}$), then into tonal conversion intensity values ($y_n$) to determine a reference tonal conversion curve ($y_o$) by conducting a specific tonal conversion formula (1). On the other hand, density values (from $D_{Hn}$ to $D_{Sn}$) ranging from a highlight part to a shadow part of the individual photographic original picture are converted into corresponding light intensity information values ($X_{Hn}$ to $X_{Sn}$), the into tonal conversion intensity values ($y_n$) to determine an individual tonal conversion curve ($y_n$) in a similar manner. Then, the individual tonal conversion curve ($y_n$) is made to coincide with the reference tonal conversion curve ($y_o$) in a predeterminedly divided region.

8 Claims, 2 Drawing Sheets

TONAL CONVERSION METHOD FOR A PICTURE

BACKGROUND OF THE INVENTION

1. Field of the Invention

The present invention relates to a novel method for converting a tone of a picture upon producing a printed picture in a halftone from a photographic are final picture in a continuous tone.

Particularly, the present invention provides a method for converting a tone of a picture, which method is effective in the event a printed picture having appropriate tonal characteristics is intended to be produced from an original picture as a photographic original which does not have a wide density range from H part (the brightest part) to S part (the darkest part), namely said original picture not having both of the H and S parts or either one of them, or in the event that a printed picture having entirely appropriate tonal characteristics is intended to be produced by totalizing sectional (stepwise) information inputted from a sensor when only such the divisional (stepwise) picture information is available due to characteristics of the sensor.

2. Prior Art

As well known, what becomes a crux a production process of a printed picture from a photographic original picture is a color-separation technique.

Although a scanner (including monochrome- and color-scanner, hereinafter the same), which is manufactured introduced modern technologies such as electronics, computer, and the like, is used as a working tool in the color-separation technique nowadays, the color-separation technique is essentially based on experiences and intuition recklessly, it still thus remaining in a non-scientific and irrational stage. Such circumstances are bespoken by the fact that it is still taken up as a subject in the controversy whether the color-separation work is a technology or an art.

Giving a further explanation about this, the conventional color-separation technique has been developed on the basis of a color photograph processing technique or a photographic masking technique. Namely, in the color-separation technique, a fundamental way of thought of formation of a printed picture excessively inclines toward the processing technique of photographic pictures so as to fail to understand, study and analyze the essence of printed pictures themselves and the production process of a printed picture. Because only the color-separation technique established from a viewpoint of the photographic processing technique is considered to be an object of studies and developments in the conventional color-separation technique so that conversion of a picture tone, which is positioned in the first step in the formation of a printed picture and gives a decisive effect to the quality of a printed picture, a following relationship between the tone and the color-tone of a printed picture, and techniques of adjustment, correction, change, etc. of color are placed outside studies and developments. As a result, these techniques still remain in a state based on experiences and intuition of man, which can be considered to be a fundamental fault.

A scanner is used nowadays in the color-separation work as a modern working device, but setting of a tonal conversion curve (referred to as "a tone curve" in a monochromatic scanner, "a color-separation curve" or "color-separating characteristic curve" in a color scanner, or the like, hereinafter the same), which becomes a core of the working operation, is carried out, by selecting a suitable one (however no assurance if it is satisfactory or not) out of several tonal conversion curves which are made on the basis of experiences of the scanner manufacturer and stored in the storing system of the scanner. Or it is carried out by calling out, when necessary, a tonal conversion curve stored in the storing system of the scanner, which has been made on the basis of experiences and intuition of each scanner user, and considered to be the most suitable to his own work conditions. Such present circumstances are attributable to that no rational theory is given to a work of tone adjustment of a picture, two essential works (adjustment of tone and adjustment of color-tone) in the color-separation process being treated by a color scanner at present.

This is a good instance showing a fact that the conventional color-separation technique is essentially based on experiences and intuition of man although used therein a scanner.

Likewise, a high-level mechanism is adopted in the electronic plate-making technical system such as monochromatic scanner, color-scanner, or the like, but a tonal conversion curve which becomes a core of the working operation by a scanner is made unscientifically and irrationally. Scientific and rational formation of a tonal conversion curve which becomes a core in the working operation of a scanner is, in fact, an essential prerequisite to scientifically and rationally carry out conversion of a picture tone, simultaneous maintenance of a tone and a color-tone, and the like.

The present inventors have solved and overcome these disadvantages and limitations of the conventional color-separation technique mentioned above, and made a various proposals to establish a scientific and rational color-separation technique.

That is, the present inventors proposed a number of techniques, a technique for scientifically setting a tonal conversion curve, which becomes a crux of the work upon forming a printed picture in a halftone, and conducting tonal conversion of a picture by utilizing such the tonal conversion curve set in the scientific manner (Japanese Patent Application No. 62-148912, U.S. Pat. No. 4,811,108), a technique for plate-making applied the above tonal conversion technique for a picture (Japanese Patent Application No. 62-165231, U.S. Pat. No. 4,833,546), a technique for controlling a halftone dot area percent, which is applied the above tonal conversion technique for a picture (Japanese Patent Application No. 62-198302), and on.

The present inventors proposed graded-up techniques of these for setting a tonal conversion curve, which allow them to comply with not only an original picture having a standard picture quality but also a non-standard original such as over-, under-exposed, or the like (Japanese Patent Application Nos. 63-114599, 63-207326), as well.

Additionally, the present inventors further proposed another techniques (Japanese Patent Application No. 1-135825) in order to shift the conventional technical system, in which density information values are utilized as picture information values of an original upon setting a tonal conversion curve, into a novel technical system, in which picture information values relating to light intensity (light exposure) obtained from a subject (real scene) forming a base of the original picture are utilized.

The said techniques (Japanese Patent Application No. 1-135825 and the like) being adopted light intensity information values therein to set a tonal conversion curve are quite unique, whereby a printed picture having an appropriate tone became available without effected by the quality of an original picture (over- or under-exposed original, or original in a high- or low-key which is said to be difficult to convert its tone, or color-fogged original). Further, since a tonal conversion curve (a curve defining a relationship between light intensity information values obtained from density information values and dot area % values) set according to these techniques defines tonal characteristics (a state of dot arrangement) of a finally produced printed picture, it was found that these techniques have such a superior performance that an observation of a tonal conversion curve makes it possible to skip a proofing, at least a printer's proofing. On the other hand, the conventional tonal conversion curve which is defined on the basis of a relationship between density information values and dot area % values has a complicated shape so that it is difficult to tell the tonal characteristics of a finally obtained printed picture only by observing the curve. Consequently, it is necessary to conduct a proofing to evaluate the adequacy of a tonal conversion.

It is an object of the present invention to provide a method for converting a tone of a picture to produce a printed picture having appropriate tonal characteristics from an original picture devoid of both of its H and S part or either one of them, while being employed therein a technique for setting: a tonal conversion curve on the basis of light intensity information values, which technique has been proposed by the present inventors. There is a strong demand for development of a rational tonal conversion method, as the conventional technique completely depending upon experiences and intuition of man.

There is provided a method for converting a tone of a picture upon producing a printed picture in a halftone from a photographic original picture in a continuous tone, in which a density information value ($D_n$) of each pixel of the photographic original picture into a light intensity information value ($X_n$) by employing a photographic density characteristic curve of the photographic original, which is expressed in an D-X orthogonal coordinate system of which D axis represents density information values and X axis represents light intensity information values, and determining a tonal conversion intensity value ($y_n$) from said $X_n$ value by way of a tonal conversion formula (1), which method comprising the steps of:

(1) defining a desired $Y_o$ value as a $Y_n$ value in the tonal conversion formula (1) to define a reference tonal conversion curve ($y_o$) in order to obtain a picture with a desired tone from a reference photographic original picture, which becomes a reference, having values ranging from a H (highlight) part density value ($D_{Ho}$) to an S (shadow) part density value ($D_{So}$), said reference tonat conversion curve ($y_o$) being defined from relationships of the tonal conversion intensity values ($y_n$) which are determined from light intensity information values ($X_{Ho}$-$X_{So}$) converted from the corresponding density values ($D_{Ho}$-$D_{So}$) by conducting the tonal conversion formula (1) by employment of the $Y_o$ value therein;

(2) determining an $Y_n$ value in the tonal conversion formula (1) by conducting formula (2):

$$Y_n = (Y_o) \times [(X_{Hn} - X_{Sn})/(X_{Ho} = S_{So})] \quad (2)$$

in order to adopt an individual tonal conversion curve ($y_n$) of an individual photographic original picture having: a density range from ($D_{Hn}$) to ($D_{Sn}$) falling within the range from the H part density value ($D_{Ho}$) to the S part density value to the reference tonal conversion curve ($y_o$) in a range from ($X_{Hn}$) to ($X_{Sn}$), said individual tonal conversion curve ($y_n$) being defined from a relationship of the tonal conversion intensity values ($y_n$) which are determined from light intensity information values ($X_{Hn}$-$X_{Sn}$) converted from the corresponding density values ($D_{Hn}$-$D_{Sn}$) by conducting the tonal conversion formula (1) by employment of the $Y_n$ value therein; and (3) conducting a tonal conversion such as to determine the tonal conversion intensity value ($y_n$) from the light intensity information value ($X_{Hn}$-$X_{Sn}$) corresponding to the density information value ($D_{Hn}$-$D_{Sn}$) of the individual photographic original picture by making use of the $Y_n$ value and the tonal conversion formula (1):

$$y_n = y_{Hn} + \frac{\alpha(1 - 10^{-\gamma_n \cdot \frac{X_n}{X_{Sn} - X_{Hn}}})}{\alpha - \beta} \cdot (y_{Sn} - y_{Hn}) \quad (1)$$

where n: becoming n when applied to the individual photographic original picture, while becoming 0 when applied to the reference photographic original picture;

$X_n$: showing a basic light intensity information value ($X_n = X_n' - X_{Hn}$) determined by subtracting the light intensity information value ($X_{Hn}$) of a corresponding pixel, which value ($X_{Hn}$) is determined from the density information value ($D_{Hn}$) of the brightest (H) part on the photographic original picture via the photographic density characteristic curve, from the light intensity information value ($X_n'$) of a corresponding pixel from the density information value ($D_n$) of an arbitrary pixel on the photographic original picture by making use of the photographic density characteristic curve;

$X_{Sn}$, $X_{Hn}$: light intensity information values ($X_{Sn}$, $X_{Hn}$) of corresponding pixels determined from the density information values ($D_{Sn}$, $D_{Hn}$) of the darkest (S) and brightest (H) parts on the photographic original picture via the photographic density characteristic curve, respectively;

$y_n$: (of the reference or individual) a tonal intensity value preset to a pixel on a reproduced picture corresponding to an arbitrary pixel on the photographic original picture;

$y_{Hn}$: (of the reference or individual) a tonal intensity value preset to the brightest (H) part on the photographic original picture;

$y_{Sn}$: (of the reference or individual) tonal intensity value preset to the darkest (S) part on the photographic original picture;

$\alpha$: a surface reflectance of a printed paper used to express a printed picture;

$\beta$: a value determined by $\beta = 10^{-Y_n}$; and $Y_n$: an arbitrary coefficient.

An advantage of the tonal conversion method of a picture of this invention conducted upon producing a halftone printed picture from a photographic original picture in a continuous tone is that the method makes it possible to quite rationally convert the tone of the photographic picture not having a wide range spreading from its H part (brightest part) to S part (darkest part), namely devoid of both of the H and S parts or either one of them.

Another advantage of the tonal conversion method of a picture according to this invention is that the method also makes it possible to produce a printed picture having appropriate tonal characteristics, when looking throughout the picture, by unifying sectional (stepwise) input information of a picture, when applied a system for obtaining information which is suitable rather to sectional (stepwise) picture information due to the characteristics of an input sensor of the system.

The above and other objects, features and advantages of the present invention will become apparent from the following description and the appended claims taken in conjunction with the accompanying drawings, in which:

DETAILED DESCRIPTION OF PREFERRED EMBODIMENT

A motive of the present invention was how rationally to conduct a tonal conversion of an original not having normal density values ranging from H part density values to S part density values at a usual density level as a photographic original (a normal color-film photographic original having density values ranging from H to S part, 030-2.80 or the like, for example) and how to produce therefrom a printed picture having appropriate tonal characteristics. Incidentally, the density level shown above is a mere example, thus not limited to that range. It is a matter of course that the term of "photographic original" embraces positive or negative, transparent or reflection, monochrome or color original, etc. in the above description.

In other words, the point of the present invention was how rationally to convert an individual original picture (hereinafter, referred to as "an individual photographic original") having a density range which drops within a range of density values from H part ($D_{Ho}$) to S part ($D_{So}$) of a standard (reference) original, in a sense that a standard (reference) original has both H and S part [a case of n=0 in the tonal conversion formula (1)].

Incidentally, it should be hereinafter understood that such the individual photographic original possesses density information values $D_{Hn}$ and $D_{Sn}$ in the H and S part, respectively. Additionally, it should be understood that the density range having density values ($D_{Ho}$, $D_{So}$) in the H and S part of a standard (reference) original includes not only a standard range but also a density range ($D_{Hn}$-$D_{So}$) of an individual original picture, not sticking to the term "standard".

The inventors consider a criterion of judgement about whether a tonal conversion has been carried out appropriately when converting such an individual photographic picture, as follows. Namely, if a desirable reference tonal conversion curve ($y_o$) is set to a reference photographic original, to be a reference, having a density range of H part density value ($D_{Ho}$) and S part density value ($D_{So}$), it is considered that a tone of an individual photographic picture is appropriately converted so far as a relationship between the reference tonal conversion curve ($y_o$) and an individual tonal conversion curve ($y_n$) having $D_{Hn}$-$D_{Sn}$ within the dynamic range of $D_{Ho}$-$D_{So}$ is maintained at $y_o=y_n$ (meaning that both the curves are coincided in said range). Because the $y_o$ set by conducting the tonal conversion formula (1) of the present invention assures formation of a printed picture having a density tone in the range of $D_{Ho}$ to $D_{So}$ felt natural to human visual sensation, as far as a relationship of $y_o=y_n$ is established, the $y_n$ included within said range can be also considered to allow tonal conversion curve capable of providing a printed picture with a density tone felt natural to human visual sensation.

More generalizing this, taking into the above-described demand in relation with a tonal conversion (namely, a problem of a tonal conversion of a photographic original picture lacking both H and S parts or either one of them, distinguished from a reference photographic original), there are expectations of the development of a rational method permitting the dynamic range from $D_{Ho}$ to $D_{So}$ to be arbitrarily divided into regions, and $y_o$ and $y_n$ to be coincided with each other in each of the divided region when setting a reference tonal conversion curve ($y_o$) for a reference photographic original with a range from $D_{Ho}$ to $D_{So}$.

As described hereinbefore, the present inventors have developed a method for conducting tonal conversion, based on not density information values of a photographic original, but light intensity information values or logarithmic values obtained by converting the density information values into logarithmic values (hereinafter referred to as light intensity values) via a characteristic curve of a photographic emulsion (photographic density characteristic curve) when determining a tonal conversion curve (Japanese Patent Application No. 1-135825). Incidentally, a photographic density characteristic curve is generally shown in a D-X orthogonal coordinate system, of which D axis (vertical axis) represents density information values and X axis (horizontal axis) represents light intensity information values (logarithmic values of light intensity values).

When light intensity information value are obtained from density information values by utilizing the photographic density characteristic curve according to the present invention, it is possible to perform that computation in such a fashion as to coincide scale of the X axis representing the density information values with a scale of the D axis representing the density information values. In other words, not absolute values on the X axis, but values correlating with them may be used. In this meaning, values on the X axis are referred to as "light intensity values correlative with logarithmic values of light exposure", or merely as "light intensity information values" in the present invention. It is a matter of course, in the present invention, that a scaling is not limited to the above instance.

In the above manner, the light intensity values can be obtained as picture information values for used in a tonal conversion. The light intensity information values are adopted in the present invention from a following reason. In the conventional tonal conversion method, there are used density information values as previously described, which are picture information values having been affected with the characteristics of a photographic emulsion. To the contrary, the light information values is regarded as picture information attached to a camera subject itself. If conducting tonal conversion on the basis of that picture information, it is considered that reproduction of a tone faithful to the camera subject will be accomplished.

A conversion of the density information values into the light intensity values has an important meaning in the present invention, as previously set forth. More detailed description of this point will be given heretofore.

Figure 1:
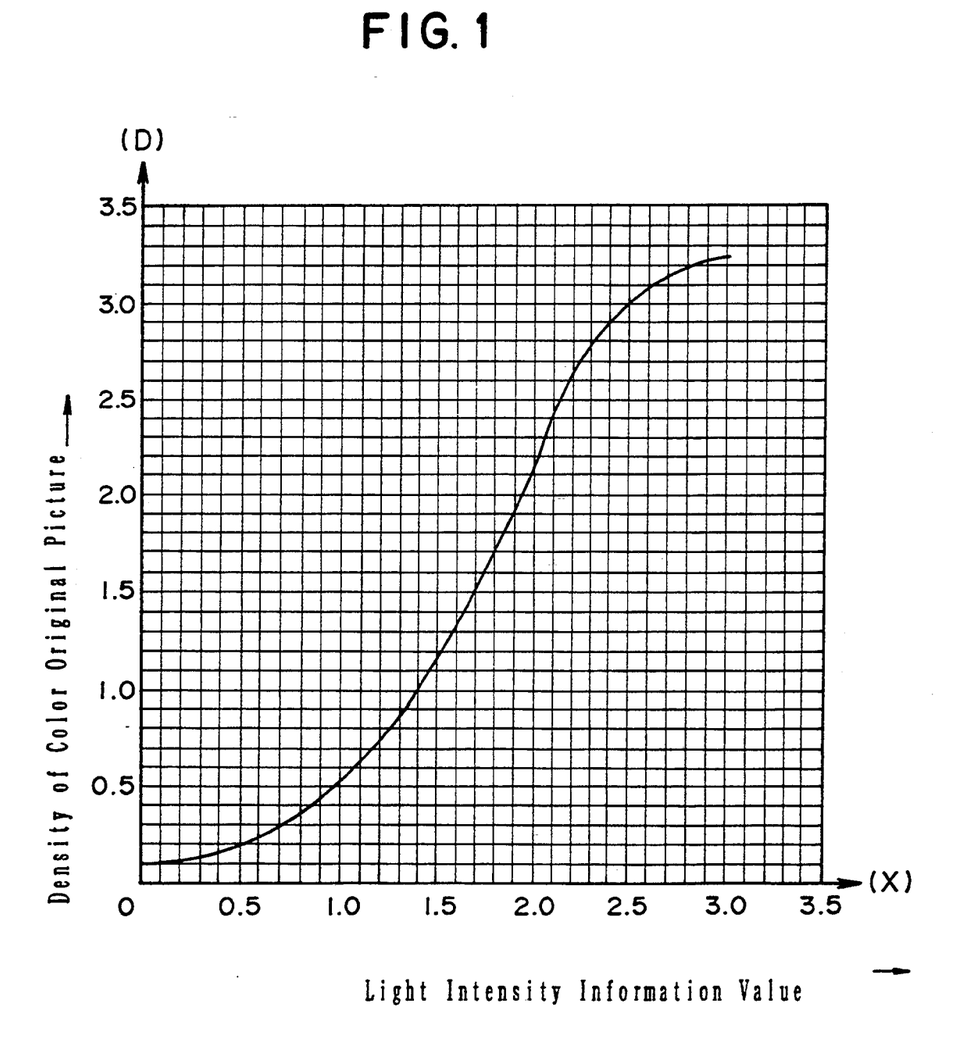
FIG. 1 shows a photographic density characteristic curve of a color film.

Particularly referring to FIG. 1, there is shown a photographic density characteristic curve of a color-film. If the density characteristic curve is expressed as functions of $D=f(X)$. D values can be readily converted into X values by using inverse functions thereof.

Table 1 shows results of functional formulation of the density characteristic curve in FIG. 1. Incidentally, in Table 1 a plurality of divisions are adopted in order to formulate the photographic density characteristic curve as accurately as possible.

TABLE 1

Formulae of A Photographic Density Characteristic Curve

1. Formulae of A Density Characteristic Curve of Red Emulsion Layer of A Color-Film Formulae converting color-original density (Dn) on the D axis into values (Xn) on the X axis

| NO | Dn | Xn |
|---|---|---|
| 1 | 0.10–0.50 | $X = \log\{D - 0.0424\} \div 0.04576\}$ |
| 2 | 0.50–1.00 | $X = 1.00 + 0.7800(D - 0.50)$ |
| 3 | 1.00–1.50 | $X = 1.39 + 0.6200(D - 1.00)$ |
| 4 | 1.50–2.00 | $X = 1.70 + 0.4400(D - 1.50)$ |
| 5 | 2.00–2.50 | $X = 1.92 + 0.4200(D - 2.00)$ |
| 6 | 2.50–2.80 | $X = 2.13 + 0.5000(D - 2.50)$ |
| 7 | 2.80–2.95 | $X = 2.28 + 0.8000(D - 2.80)$ |
| 8 | 2.95–3.20 | $X = 1.3 + e^{\frac{1}{100} \cdot 10(D-2.5608) \div 0.3975}$ |

FIG. 1 shows the density characteristic curve of Red (R) emulsion layer as a photographic emulsion layer, C plate for multi-color printing being produced by making use of picture information obtained therefrom. To produce remaining color-plates (M and Y plates), it is, of course, necessary to formulate density characteristic curves of G (Green) and Y (Yellow) emulsion layers to determine respective light intensity information values. As a convenient manner, it is possible to obtain density information values for production of the C, M and Y plates by utilizing only the photographic density characteristic curve for the R emulsion layer to conduct a tonal conversion under the tonal conversion formula (1). Its effectivity has been experimentally verified.

In the above fashion, the density information value ($D_n$) of each pixel of the photographic original picture in a continuous tone may be rationally converted into a light intensity information value ($X_n$) by applying the density characteristic curve of the photographic original.

The next will be explanations about a relationship between a reference photographic original picture having a density range from a H part density value $D_{Ho}$ to an S Dart density value $D_{So}$ and an individual photographic original picture having a density range falling within the range of the reference photographic original picture, and further a rational tonal conversion method for the latter picture.

As previously illustrated, this has the same meaning of a method in which, if a reference tonal conversion curve ($y_o$) for used in formation of a printed picture having a rich and natural tone to human vision from a reference photographic original having a density range from a $D_{Ho}$ to $D_{So}$ was set, an individual tonal conversion curve ($y_n$) is coincided with the said curve ($y_o$) in each of arbitrarily divided regions of the density range from the $D_{Ho}$ to $D_{So}$. That is, this has the same sense with a divisional controlling technique of a picture tone based on a curve ($y_o$) as to a point of rationally controlling of a divided curve ($y_n$) within the curve ($y_o$). The following description will include this point.

Figure 2:
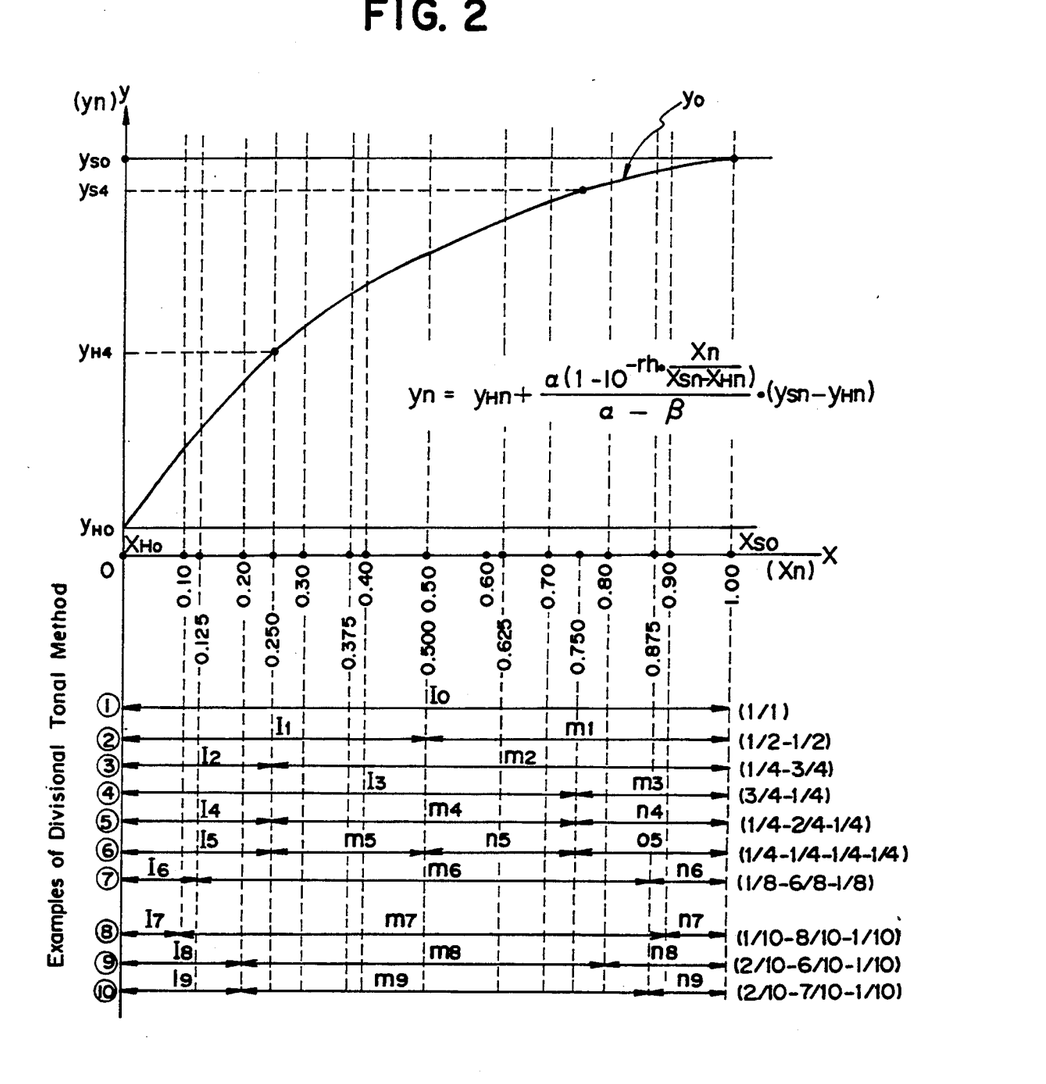
FIG. 2 shows an explanatory illustration of a divisional control method of a picture tone according to the present invention.

Referring to FIG. 2, the above point will be described. FIG. 2 illustrates of a a divisional controlling method picture tone.

In order to emphasize a standpoint that the light intensity values are given importance as picture information values, a large part of the following explanation will be given, using the light intensity information values ($X_n$) converted by way of a photographic density characteristic curve of a photographic emulsion, which has been used upon producing a photographic original picture, from density information values ($D_n$) of the photographic original.

Although it is unusual that $X_{So}$-$X_{Ho}$ becomes 1.00 when density range from $D_{Ho}$ to $D_{So}$ of a predetermined reference photographic original picture is converted into a light intensity information value range from $X_{Ho}$ to $X_{So}$, hence the light intensity information value range is regularized to 1.00, taking into account convenience of its calculation. But their relative relationship remains unchanged since the light intensity information values of the divided regions will be regularized at an equal ratio in such the regularization.

A lower part of FIG. 2 shows several examples of division of a picture tone. More specifically, there are shown various modes of regions divided within a light exposure range ($X_{Ho}$-$X_{So}$) of the reference photographic original.

Numeral (1) shows an example of a reference photographic original picture with $D_{Ho}$ in H part and $D_{So}$ in S part as density information values, and accordingly $X_{Ho}$ and $X_{So}$ as corresponding light intensity values. respectively. As shown, the light intensity information range ($I_o$) is not divided because of being of an original picture to become a reference.

A picture designated by numeral (2) is divided into $I_1$ and $m_1$, and a picture designated by numeral (5) is divided into $I_4$, $m_4$ and $n_4$. In the case of an individual photographic original devoid of its H and S parts, its light intensity information values correspond to $m_4$ of (5), for example. Also, a picture having only thee H part and not S part, and a picture having only S part and not H part correspond to $I_1$ of (2) and $m_1$ of (2), respectively.

The upper part of FIG. 2, shows a reference tonal conversion curve ($y_o$) for C plate, obtained by substituting light intensity information values [light intensity values ($X_n$) within a range from $X_{Ho}$ to $X_{So}$] of a reference photographic original picture into the tonal conversion formula (1).

As representative operational conditions of the tonal conversion formula (1) used upon obtaining a reference tonal conversion curve ($y_o$), $\alpha=1.00$, $Y_{Ho}=5\%$ (dot area), $y_{So}=95\%$ (dot area) and $Y_n=Y_o=0.45$ are considered to be adequate in relation with plate-making practice. Under these conditions, a printed picture of which picture quality is admitted to be excellent in a lot of subjective evaluation may be produced. Namely, the tonal conversion by means of the tonal conversion formula (1) allows production of a printed picture excellent in tonal characteristics and natural to human visual sensation in its range from H part ($D_{Ho} \to X_{Ho}$) to S part ($D_{So} \to X_{So}$). In the present invention, the reference tonal conversion curve ($y_o$) such obtained becomes a base of reference (reference) of a divided individual tonal conversion curve ($y_n$).

Next description will be about the tonal conversion formula (1) used upon producing a reference tonal conversion curve ($y_o$) and an individual tonal conversion curve ($y_n$) of this invention.

The tonal conversion formula (1) of this invention was rationally derived as follows. That is to say, it is preferable in production of a printed picture in a halftone that an equation (formula) defining a tonal conversion is such established that a dot area % value (y) of a dot on a control sample point (Y) on the printed picture is determined from a density value (x) of an arbitrary control sample point (X) corresponding to the control sample point (Y) on an original picture. besides sizes of halftone dots desired to be placed to H and S parts of a printed picture are arbitrarily selected on the basis of values of reflected density of a printing paper and printing inks, The said formula for determining a halftone dot area % value (y) was derived from a generally admitted density formula (photographic density, optical density), that is:

$$D = \log I_o/I = \log 1/T$$

where $I_o$: incident light intensity;

I: reflected light intensity or transmitted light intensity; and $T = I_o/I$: reflectance or transmittance.

When applied to a process of plate-making and printing, the general formula relating to density (D) becomes:

Density ($D'$) in plate-making and printing $= \log \dfrac{I_0}{T} =$ $\log \dfrac{(\text{unit area}) \times (\text{reflectance of paper})}{\{(\text{unit area}) - (\text{dot area})\} \times (\text{reflectance of paper}) + (\text{dot area}) \times (\text{surface reflectance of ink})} =$ $\log \dfrac{\alpha A}{\alpha\{A - (d_1 + d_2 + \ldots d_n)\} + \beta(d_1 + d_2 + \ldots d_n)}$ where A: unit area;

$d_n$: dot area in the unit area;

$\alpha$: reflectance of printing paper; and $\beta$: surface reflectance of printing ink.

The density formula ($D'$) is incorporated requirements of arbitrarily setting the largest value of a dot area % ($y_s$) of the darkest Dart and the smallest value ($y_H$) of the brightest part of a halftone picture to be produced, as previously described, besides associating a density value (x) of an arbitrary sample point (X) on an original picture in a continuous tone with a dot area % value (y) of a dot on a sample point (Y) on a printed picture in a halftone, corresponding to the sample point on the printed picture so that a formula is derived such as that a theoretical value approximately coincides with a measured value.

As a result, a formula for determining a value (y) of dot area % is given:

$$y = y_H + \dfrac{\alpha(1 - 10^{-kX})}{\alpha - \beta} \cdot (y_S - y_H)$$

where x: a basic density value, namely a value determined by subtracting a density value of a pixel in the brightest part (H) from a density value of an arbitrary pixel;

$\beta$: $10^{-Y}$;

k: Y/(a difference of picture information values relating to density information in S and H parts of an original picture); and Y: an arbitrary value.

In the case of $\alpha = 1.0$ in the formula such derived, it is possible to set predetermined dot area % values (y) to the brightest and darkest parts on all occasions.

This is obvious from the following point. That is, it is obvious from the definition that x (basic density value) becomes 0 in the brightest part and x becomes a difference of picture information values relating to density information in the S and H parts of the original picture, hence $-kx = -Y$.

It is quite rational to conduct (as $\alpha = 1$) the formula in the manner as above mentioned. The reason is that when density information is obtained by using a densitometer, it is a common practice in the field of art to normally do zero-point adjustment of the densitometer on the basis of a brightness degree of a printing paper.

As also obvious from the characteristics of the above formula, it is possible to change the shape of the curve into an upwardly curved by taking a minus Y value or into a downwardly curved by taking a plus Y value. This means that it is possible to rationally and regularly adjust a tone in H and/or S part to a desired by varying the Y value.

Picture information values becoming a base are density information values in the above-mentioned formula, while light intensity values become a base in the tonal conversion formula (1) according to the present invention.

Characteristics of a tonal conversion curve made by utilizing the tonal conversion formula (1) are something showing tonal characteristics (arrangement of dots) of a final printed picture, as previously described, and the shape of the curve largely depends on the Y value, the Y value controlling the shape to a large extend as also described hereinbefore, so an operator can set a desired $Y_n$ value during observing the shape of the curve. (Incidentally, to set the Y value at 0.45 allows a printed picture to be superior in tonal characteristics in normal cases, as previously described.)

The reference tonal conversion curve shown in the upper part of FIG. 2 is used upon converting a reference photographic original picture with a light intensity information value range ($X_{no} = 0.00$ and $X_{xo} = 1.00$) indicated $I_o$ under conditions of a predetermined $Y_n$ value ($Y_n = Y_o$), $Y_{Hn} = y_{Ho}$ and $y_{Sn} = y_{So}$, and $\alpha = 1.00$. (Meanwhile, $Y_{Ho} = 5\%$ and $y_{S0} = 95\%$ are normally set for C plate in this field.) It is now assumed that a printed picture retaining a superior tonal characteristics can be produced when converted under the curve ($y_o$). This assumption is considered to be quite rational from the reason aforedescribed.

Next description will be about a tonal conversion method for an individual Photographic original picture having a light intensity information value range ($X_{Hn}$=0.250 and $X_{Sn}$=0.75), as indicated by $m_4$ of example (5).

In Comparison with $I_o$, $m_4$ is a different light intensity information range (corresponding to a difference of density information values retained by a photographic original picture, of course), as clearly seen.

As previously set forth, in order to produce a printed picture having a superior tonal characteristics, the individual tonal conversion curve (hereinafter referred to as $y_4$) of $m_4$ must be adapted to $y_4=y_o$ within the range of $m_4$.

Operational conditions of the tonal conversion formula (1) for obtaining the individual tonal conversional curve ($y_4$), namely $Y_{Hn}=Y_{H4}$ set to $X_{Hn}=X_{H4}=0.25$ and $y_{Sn}=y_{S4}$ set to $X_{Sn}=X_{S4}=0.75$, are decided depending on the curve ($y_o$) in association with the print above mentioned.

In other words, a parameter which should be determined upon conducting: the tonal conversion formula (1) is a Y value (hereinafter referred to as $Y_4$). $Y_{Ho}$ and $Y_{So}$ of the curve ($y_o$) are obviously different from $y_{H4}$ and $y_{S4}$, so the $Y_o$ value for the curve ($y_o$) cannot be used as a $Y_n=Y_4$ value for the curve ($y_4$).

According to the present invention, a value of $Y_n=Y_4$ may, however, be rationally determined in the following fashion. As substantiated by the experimental data of examples shown hereinafter, the $Y_4$ may be rationally determined by a formula:

$$Y_4=Y_o\times[(X_{H4}-X_{S4})/(X_{Ho}-X_{So})].$$

In the above formula, $(X_{H4}-X_{S4})$ and $(X_{Ho}-X_{So})$ show ranges of light intensity values of the individual and reference photographic original picture, respectively. In the above example, it is sufficient to use a value of $Y_4=Y_o\times[0.5/1.0]=0.5Y_o$.

More generally, the $Y_n$ value for a divided region is determined by the following formula (2):

$$Y_n=Y_o\times[X_{Hn}-X_{Sn})/(X_{Ho}-X_{So})] \qquad (2)$$

The above formula (2) was derived from deductive guessing of the present inventors. That is, light intensity information values obtained by utilizing a photographic density characteristic curve is density-linearly evaluated (logarithmically evaluated) from discrimination characteristics of human visual sensation besides the tonal conversion formula (1) used for processing the light intensity values is incorporated the density formula, thus resulting converted tone is also density-linearly evaluated (which means tonal characteristics felt natural to human vision). Taking consideration these points, it is guessed that the tonal conversion formula (1) may be conducted in relationship of a ratio of the light intensity information value range to the reference range, if there is a difference therebetween.

If according to the above manner for deciding the parameters when conducting the tonal conversion formula (1). the individual tonal conversion curve ($y_n$) can be coincided with certainty, in a divided range with the reference tonal conversion curve ($y_o$). In other words, it is possible to rationally decide the individual conversion curve ($y_n$) upon producing a printed picture with excellent tonal characteristics from the individual photographic original devoid of H and S parts, dissimilar to the reference photographic original picture.

It is also possible to rationally decide a $Y_n$ value for $I_4$ range of example (5) (the $Y_n$ value becoming $0.25Y_o$ in this case) and a $Y_n$ value for the $n_4$ range of the same (the $Y_n$ becoming $0.25Y_o$ in this case) so that the individual tonal conversion curve ($y_n$) may be completely coincided with the reference tonal conversion curve ($y_o$) in these ranges.

It is a present circumstance in the plate-making field that there are a lot of photographic originals not having both of H and S parts or either one of them, which are conducted color-separation work largely depending upon the operators' experiences and intuition. To the contrary, the present invention provides a method for a rational treatment of such the photographic originals.

Hereinafter, the present invention will be described in detail by way of following examples.

EXAMPLE 1

First, $y_o$ (the reference tonal conversion curve) shown in FIG. 2 was set under the following conditions:
1. $Y_o$ (0.4500) $y_{Ho}-y_{So}=0.00-100.00$ (divisional control method No.1)
1. $Y_o$ (0.4500) $y_{Ho}-y_{So}=0.00-95.00$ (divisional control method No.2)
1. $Y_o$ (0.4500) $y_{Ho}-y_{So}=5.00-100.00$ (divisional control method No.3)
1. $Y_o$ (0.4500) $y_{Ho}-y_{So}=5.00-95.00$ (divisional control method No.4)
1. $Y_o$ (0.4500) $y_{Ho}-y_{So}=5.00-95.00$ (divisional control method No.5)
1. $Y_o$ (0.4500) $y_{Ho}-y_{So}=5.00-95.00$ (divisional control method No.6)

The curve ($y_o$) was then divided into predetermined sections (from case A to case D). And the $Y_n$ value for coinciding each part of the $y_n$ (individual tonal conversion curve) with the $y_o$ in the divided range was examined whether it can be determined by a formula:

$$Y_n=Y_o\times[X_{Hn}-X_{Sn})/(X_{Ho}-X_{So})] \qquad (2)$$

The results are shown in Table 2 to 7.

In Tables, $y_A$ shows dot area % values at predetermined light intensity information values of $y_o$, and $y_B$ to $y_D$ show dot area % values of corresponding $y_n$. Smaller magnitude of errors in column $y_A$-$y_B$, $y_A$-$y_C$ and $Y_A$-$Y_D$ shows higher degree of coincidence of them.

TABLE 2

| Divisional Control Method No. 1 ($y_{Ho}$-$y_{So}$ = 0.00–100.00) | | | | | | |
|---|---|---|---|---|---|---|
| | | | Example of division | | | |
| | | Case A (1/1) | | | Case B (½-½) | |
| No. | Xn | $\gamma_o$ | $y_A$ | $\gamma_n$ | $y_B$ | $y_A - y_B$ |
| 1 | 0.0000 | 0.4500 | 0.0000 | 0.2250 | 0.0000 | 0.0000 |
| 2 | 0.1250 | | 18.8288 | | 18.8305 | +0.0017 |
| 3 | 0.2500 | | 35.3702 | | 35.3736 | +0.0034 |
| 4 | 0.3750 | | 49.9021 | | 49.9068 | +0.0047 |
| 5 | 0.5000 | | 62.6686 | 0.2250 | 62.6686 | 0.0000 |
| 6 | 0.6250 | | 73.8842 | | 73.8859 | +0.0017 |
| 7 | 0.7500 | | 83.7373 | | 83.7304 | +0.0069 |
| 8 | 0.8750 | | 92.3934 | | 92.3978 | +0.0044 |
| 9 | 1.0000 | | 100.0000 | | 100.0000 | 0.0000 |
| | | | Example of division | | | |
| | | Case C (¾-¼) | | | Case D (¼-¾) | |
| No. | $\gamma_n$ | $y_C$ | $y_A - y_C$ | $\gamma_n$ | $y_D$ | $y_A - y_D$ |
| 1 | 0.3375 | 0.0000 | 0.0000 | 0.1125 | 0.0000 | 0.0000 |
| 2 | | 18.8278 | −0.0010 | | 18.8295 | +0.0007 |
| 3 | | 35.3684 | −0.0022 | 0.3375 | 35.3702 | 0.0000 |
| 4 | | 49.8996 | −0.0025 | | 49.9018 | −0.0003 |
| 5 | | 62.6655 | −0.0031 | | 62.6681 | −0.0005 |
| 6 | | 73.8805 | −0.0037 | | 73.8835 | −0.0007 |
| 7 | 0.1125 | 83.7373 | 0.0000 | | 83.7364 | −0.0009 |
| 8 | | 92.3948 | +0.0014 | | 92.3924 | −0.0010 |

TABLE 2-continued

Divisional Control Method No. 1 ($y_{Ho}-y_{So}$ = 0.00-100.00)

| 9 | 100.0000 | 0.0000 | 100.0000 | 0.0000 |

TABLE 3

Divisional Control Method No. 2 ($y_{Ho}-y_{So}$ = 0.00-95.00)

Example of division

| | | Case A (1/1) | | Case B (½-½) | | |
|---|---|---|---|---|---|---|
| No. | $X_n$ | $\gamma_o$ | $y_A$ | $\gamma_n$ | $y_B$ | $y_A - y_B$ |
| 1 | 0.0000 | 0.4500 | 0.0000 | 0.2250 | 0.0000 | 0.0000 |
| 2 | 0.1250 | | 17.8873 | | 17.8890 | +0.0017 |
| 3 | 0.2500 | | 33.6017 | | 33.6048 | +0.0031 |
| 4 | 0.3750 | | 47.4070 | | 47.4114 | +0.0041 |
| 5 | 0.5000 | | 59.5352 | 0.2250 | 59.5352 | 0.0000 |
| 6 | 0.6250 | | 70.1900 | | 70.1916 | +0.0016 |
| 7 | 0.7500 | | 79.5504 | | 79.5534 | +0.0030 |
| 8 | 0.8750 | | 87.7737 | | 87.7779 | +0.0042 |
| 9 | 1.0000 | | 95.0000 | | 95.0000 | 0.0000 |

Example of division

| | Case C (¾-¼) | | | Case D (¼-¾) | | |
|---|---|---|---|---|---|---|
| No. | $\gamma_n$ | $\gamma_o$ | $y_A - y_C$ | $\gamma_n$ | $y_D$ | $y_A - y_D$ |
| 1 | 0.3375 | 0.0000 | 0.0000 | 0.1125 | 0.0000 | 0.0000 |
| 2 | | 17.8864 | -0.0009 | | 17.8880 | +0.0007 |
| 3 | | 36.6000 | -0.0017 | 0.3375 | 33.6017 | 0.0000 |
| 4 | | 47.4046 | -0.0024 | | 47.4068 | -0.0002 |
| 5 | | 59.5322 | -0.0030 | | 59.5347 | -0.0005 |
| 6 | | 70.1865 | -0.0035 | | 70.1893 | -0.0007 |
| 7 | 0.1125 | 79.5504 | 0.0000 | | 79.5496 | -0.0008 |
| 8 | | 87.7751 | +0.0014 | | 87.7728 | -0.0009 |
| 9 | | 95.0000 | 0.0000 | | 95.0000 | 0.0000 |

TABLE 4

Divisional Control Method No. 3 ($y_{Ho}-y_{So}$ = 5.00-100.00)

Example of division

| | | Case A (1/1) | | Case B (½-½) | | |
|---|---|---|---|---|---|---|
| No. | $X_n$ | $\gamma_o$ | $y_A$ | $\gamma_n$ | $y_B$ | $y_A - y_B$ |
| 1 | 0.0000 | 0.4500 | 5.0000 | 0.2250 | 5.0000 | 0.0000 |
| 2 | 0.1250 | | 22.8873 | | 22.8890 | +0.0017 |
| 3 | 0.2500 | | 36.6017 | | 38.6048 | +0.0031 |
| 4 | 0.3750 | | 52.4070 | | 52.4114 | +0.0044 |
| 5 | 0.5000 | | 64.5352 | 0.2250 | 64.5352 | 0.0000 |
| 6 | 0.6250 | | 75.1900 | | 75.1916 | +0.0016 |
| 7 | 0.7500 | | 84.5504 | | 84.5534 | +0.0030 |
| 8 | 0.8750 | | 92.7737 | | 92.7779 | +0.0042 |
| 9 | 1.0000 | | 100.0000 | | 100.0000 | 0.0000 |

Example of division

| | Case C (¾-¼) | | | Case D (¼-¾) | | |
|---|---|---|---|---|---|---|
| No. | $\gamma_n$ | $\gamma_o$ | $y_A - y_C$ | $\gamma_n$ | $y_D$ | $y_A - y_D$ |
| 1 | 0.3375 | 5.0000 | 0.0000 | 0.1125 | 5.0000 | 0.0000 |
| 2 | | 22.8864 | -0.0009 | | 22.8880 | +0.0007 |
| 3 | | 38.6000 | -0.0017 | 0.3375 | 38.6017 | 0.0000 |
| 4 | | 52.4046 | -0.0024 | | 52.4068 | -0.0002 |
| 5 | | 64.5322 | -0.0030 | | 64.5347 | -0.0005 |
| 6 | | 75.1865 | -0.0035 | | 75.1893 | -0.0007 |
| 7 | 0.1125 | 84.5504 | 0.0000 | | 84.5496 | -0.0008 |
| 8 | | 92.7751 | +0.0014 | | 92.7728 | -0.0009 |
| 9 | | 100.0000 | 0.0000 | | 100.0000 | 0.0000 |

TABLE 5

Divisional Control Method No. 4 ($y_{Ho}-y_{So}$ = 5.00-95.00)

Example of division

| | | Case A (1/1) | | Case B (½-½) | | |
|---|---|---|---|---|---|---|
| No. | $X_n$ | $\gamma_o$ | $y_A$ | $\gamma_n$ | $y_B$ | $y_A - y_B$ |
| 1 | 0.0000 | 0.4500 | 5.0000 | 0.2250 | 5.0000 | 0.0000 |
| 2 | 0.1250 | | 21.9459 | | 21.9457 | +0.0016 |
| 3 | 0.2500 | | 36.8332 | | 36.8361 | +0.0029 |
| 4 | 0.3750 | | 49.9119 | | 49.9161 | +0.0042 |
| 5 | 0.5000 | | 61.4017 | 0.2250 | 61.4017 | 0.0000 |
| 6 | 0.6250 | | 71.4958 | | 71.4973 | +0.0015 |
| 7 | 0.7500 | | 80.3636 | | 80.3664 | +0.0028 |
| 8 | 0.8750 | | 88.1541 | | 88.1580 | +0.0039 |
| 9 | 1.0000 | | 95.0000 | | 95.0000 | 0.0000 |

Example of division

| | Case C (¾-¼) | | | Case D (¼-¾) | | |
|---|---|---|---|---|---|---|
| No. | $\gamma_n$ | $\gamma_o$ | $y_A - y_C$ | $\gamma_n$ | $y_D$ | $y_A - y_D$ |
| 1 | 0.3375 | 5.0000 | 0.0000 | 0.1125 | 5.0000 | 0.0000 |
| 2 | | 21.9451 | -0.0008 | | 21.9466 | +0.0007 |
| 3 | | 36.8316 | -0.0016 | 0.3375 | 36.8332 | 0.0000 |
| 4 | | 49.9097 | -0.0022 | | 49.9117 | -0.0002 |
| 5 | | 61.3990 | -0.0027 | | 61.4013 | -0.0004 |
| 6 | | 71.4925 | -0.0033 | | 71.4952 | -0.0006 |
| 7 | 0.1125 | 80.3636 | 0.0000 | | 80.3628 | -0.0008 |
| 8 | | 88.1554 | +0.0013 | | 88.1531 | -0.0010 |
| 9 | | 95.0000 | 0.0000 | | 95.0000 | 0.0000 |

TABLE 6

Divisional Control Method No. 5 ($y_{Ho}-y_{So}$ = 5.00-95.00)

Example of division

| | | Case A (1/1) | | Case B (¼-2/4-¼) | | |
|---|---|---|---|---|---|---|
| No. | $X_n$ | $\gamma_o$ | $y_A$ | $\gamma_n$ | $y_B$ | $y_A - y_B$ |
| 1 | 0.0000 | 0.4500 | 5.0000 | 0.1125 | 5.0000 | 0.0000 |
| 2 | 0.1250 | | 21.9459 | | 21.9466 | +0.0007 |
| 3 | 0.2500 | | 36.8332 | 0.2250 | 36.8332 | 0.0000 |
| 4 | 0.3750 | | 49.9119 | | 49.9131 | +0.0012 |
| 5 | 0.5000 | | 61.4017 | | 61.4041 | +0.0024 |
| 6 | 0.6250 | | 71.4958 | | 71.4991 | +0.0033 |
| 7 | 0.7500 | | 80.3636 | 0.1125 | 80.3636 | 0.0000 |
| 8 | 0.8750 | | 88.1541 | | 88.1554 | +0.0013 |
| 9 | 1.0000 | | 95.0000 | | 95.0000 | 0.0000 |

Example of division

| | Case C (¼-¼-¼-¼) | | | Case D (⅛-6/8-⅛) | | |
|---|---|---|---|---|---|---|
| No. | $\gamma_n$ | $\gamma_o$ | $y_A - y_C$ | $\gamma_n$ | $y_D$ | $y_A - y_D$ |
| 1 | 0.1125 | 5.0000 | 0.0000 | * | 5.0000 | 0.0000 |
| 2 | | 21.9466 | +0.0007 | 0.3375 | 21.9459 | 0.0000 |
| 3 | 0.1125 | 36.8332 | 0.0000 | | 36.8324 | -0.0008 |
| 4 | | 49.9124 | +0.0005 | | 49.9105 | -0.0014 |
| 5 | 0.1125 | 61.4017 | 0.0000 | | 61.3998 | -0.0019 |
| 6 | | 71.4962 | +0.0004 | | 71.4993 | -0.0025 |
| 7 | 0.1125 | 80.3636 | 0.0000 | | 80.3607 | -0.0029 |
| 8 | | 88.1554 | +0.0013 | * | 88.1543 | 0.0000 |
| 9 | | 95.0000 | 0.0000 | | 95.0000 | 0.0000 |

*: showing $\gamma_n$ value of 0.0563.

TABLE 7

Divisional Control Method No. 6 ($y_{Ho}-y_{So}$ = 5.00-95.00)

Example of division

| | | Case A (1/1) | | Case B (1/10-8/10-1/10) | | |
|---|---|---|---|---|---|---|
| No. | $X_n$ | $\gamma_o$ | $y_A$ | $\gamma_n$ | $y_B$ | $y_A - y_B$ |
| 1 | 0.0000 | 0.4500 | 5.0000 | * | 5.0000 | 0.0000 |
| 2 | 0.1000 | | 18.7300 | 0.3600 | 18.7300 | 0.0000 |
| 3 | 0.2000 | | 31.1086 | | 31.1082 | -0.0004 |
| 4 | 0.3000 | | 42.2687 | | 42.2681 | -0.0006 |
| 5 | 0.4000 | | 52.3304 | | 52.3295 | -0.0009 |
| 6 | 0.5000 | | 61.4017 | | 61.4008 | -0.0009 |
| 7 | 0.6000 | | 69.5802 | | 69.5788 | -0.0014 |
| 8 | 0.7000 | | 76.9536 | | 76.9520 | -0.0016 |
| 9 | 0.8000 | | 83.6013 | | 83.5995 | -0.0018 |
| 10 | 0.9000 | | 89.5947 | * | 89.5947 | 0.0000 |
| 11 | 1.0000 | | 95.0000 | | 95.0000 | 0.0000 |

Example of division

| Case C | Case D |

TABLE 7-continued

Divisional Control Method No. 6 (yHo–ySo = 5.00–95.00)

| | (2/10-6/10-2/10) | | | (2/10-7/10-1/10) | | |
|---|---|---|---|---|---|---|
| No. | $\gamma_n$ | $y_O$ | $y_A - y_C$ | $\gamma_n$ | $y_D$ | $y_A - y_D$ |
| 1 | 0.0900 | 5.0000 | 0.0000 | 0.0900 | 5.0000 | 0.0000 |
| 2 | | 18.7278 | −0.0022 | | 18.7278 | −0.0022 |
| 3 | 0.2700 | 31.1086 | 0.0000 | 0.3150 | 31.1086 | 0.0000 |
| 4 | | 42.2680 | −0.0007 | | 42.2694 | ±0.0007 |
| 5 | | 52.3290 | −0.0014 | | 52.3316 | +0.0012 |
| 6 | | 61.3997 | −0.0020 | | 61.4034 | +0.0017 |
| 7 | | 69.5775 | −0.0027 | | 69.5823 | +0.0021 |
| 8 | | 76.9505 | −0.0031 | | 76.9561 | +0.0025 |
| 9 | 0.0900 | 83.6013 | 0.0000 | | 83.6041 | +0.0028 |
| 10 | | 89.5947 | 0.0000 | * | 89.5947 | 0.0000 |
| 11 | | 95.0000 | ±0.0000 | | 95.0000 | 0.0000 |

*: showing $\gamma_n$ value of 0.0450.

EXAMPLE 2

An experiment was carried out in the following manner. A Japanese style painting painted by a painter K. which painting was devoid of its H and S parts was photographed on a color-film in 4"×5" (of which photographic density characteristic curve of a red-light photosensitive emulsion layer is shown in FIG. 1), under standard conditions to produce a color-photographic original picture (individual photographic original picture).

Following Table 8 shows respective density values of red (R), green (G) and blue (B) filter in the H and S parts of the above individual photographic original picture.

TABLE 8

| | H part | S part |
|---|---|---|
| R (C plate) | 0.44 | 2.53 |
| G (M plate) | 0.45 | 2.52 |
| B (Y plate) | 0.47 | 2.55 |

Next, in a stage of plate-making design for conducting color-separation work, following fundamental policies were established besides a preparatory operations were done.

(i) Primarily, finishing a tone of a reproduced printed picture to what felt natural to human vision.

(ii) Determining a region of dot area % values used to the reproduced color printed picture, on the basis of light intensity values of the reference photographic original picture (hereinafter refere to as "a standard color-original") and the individual photographic original picture (hereinafter referred to as "a color-original of K"). Since the original was photographed under standard photographing conditions. Set-up conditions of a scanner (color-scanner standard set-up data), which allows a finished tone of the reproduced color printed picture obtained from the standard color-original by way of color-separation to be natural to human vision, are decided on the basis of results of a number of experiments, as shown in Table 9. Incidentally, red (R) filter density values of the H and S parts of the standard color original are 0.30 and 0.28, respectively.

TABLE 9

| | Standard Set-up Data of Color Scanner | | | |
|---|---|---|---|---|
| | $y_{Ho}$ | Middle tone | $y_{So}$ | $\gamma_o$ |
| C plate | 5.00% | 50.00% | 95.00% | 0.4500 |
| M plate | 3.00% | 40.00% | 90.00% | 0.1850 |

TABLE 9-continued

| | Standard Set-up Data of Color Scanner | | | |
|---|---|---|---|---|
| | $y_{Ho}$ | Middle tone | $y_{So}$ | $\gamma_o$ |
| Y plate | 3.00% | 40.00% | 90.00% | 0.1850 |

Note:
Black (BL) plate was produced in the conventional manner.

(iii) Light intensity values were determined from density values of the H and S parts of the standard color-original and the color-original of K, respectively, by using the formulae of the density characteristic curve of the red (R) photosensitive emulsion layer of the color photographic material shown in Table 1. Then, a range of dot area % values for producing C plate used to a reproduced color printed picture were decided under the conditions of tonal conversion formula (1) shown in Table 9. Details of determination of the dot area % values are shown in the following Table 10.

TABLE 10

| | Density value | Light intensity value | C plate dot area % value |
|---|---|---|---|
| H part of standard color original | 0.30 ($D_{Ho}$) | 0.7505 | 5.0000 ($y_{Ho}$) |
| H part of color original of K | 0.44 ($D_{Hn}$) | 0.9390 | 21.7226 ($y_{Hn}$) |
| S part of color original of K | 2.53 ($D_{Sn}$) | 2.1450 | 90.2582 ($y_{Sn}$) |
| S part of standard color original | 2.80 ($D_{So}$) | 2.2800 | 95.0000 ($y_{So}$) |

(iv) $Y_n$ value of the tonal conversion formula (1) for obtaining an individual tonal conversion curve of the color original of K was determined in accordance with a following formula:

$$\gamma_n = \gamma_o \times [(2.1450 - 0.9390)/(2.2800 - 0.7505)]$$
$$= 0.45 \times (1.206/1.5295)$$
$$= 0.3548$$

(v) In addition to the preparatory operation for the C plate, data were prepared to produce the other plates, i.e., M and Y plates.

These plates are produced on the basis of the setting data for the C plate, as described above, so as to maintain a gray balance of the C, M and Y plates. Table 11 shows conditions adopted in this experiment to maintain the gray balance, which conditions are generally adopted in this field.

TABLE 11

| | H part | Middle tone | S part |
|---|---|---|---|
| C plate | 5% | 50% | 95% |
| M plate | 3% | 40% | 90% |
| Y plate | 3% | 40% | 90% |

Note:
Dot area % values in control points of the respective plates for maintaining the gray balance.
The Y plate has a tonal conversion curve identical to that of the M plate.

Table 12 shows more detailed conditions for maintaining the gray balance. In Table 12, dot area % values of the C plate are shown every percent, and dot area % values of the other plates (M and Y plates) corresponding thereto to maintain the gray balance are also shown side by side.

The dot area % values are calculated every percent, so intermediate values of them are computed in proportional calculations.

Color-separation set-up data for the respective plates of the color-original of K obtained in the above fashion are shown in Table 13.

TABLE 12

An Example of Correlation of Dot Area % Values for Maintaining A Gray Balance Among C, M and Y Plates

| Range of C plate dot area % | 5.00–10.00% | | 11.00–20.00% | | 21.00–30.00% | | 31.00–40.00% | | 41.00–50.00% | |
|---|---|---|---|---|---|---|---|---|---|---|
| plate type | C | M, Y | C | M, Y | C | M, Y | C | M, Y | C | M, Y |
| 1 | — | — | 11.0000 | 7.4684 | 21.0000 | 15.2023 | 31.0000 | 23.3157 | 41.0000 | 31.8674 |
| 2 | — | — | 12.0000 | 8.2230 | 22.0000 | 15.9908 | 32.0000 | 24.1462 | 42.0000 | 32.7522 |
| 3 | — | — | 13.0000 | 8.9889 | 23.0000 | 16.7867 | 33.0000 | 24.9834 | 43.0000 | 33.6337 |
| 4 | — | — | 14.0000 | 9.7560 | 24.0000 | 17.5901 | 34.0000 | 25.8274 | 44.0000 | 34.5303 |
| 5 | 5.0000 | 3.0000 | 15.0000 | 10.5209 | 25.0000 | 18.4008 | 35.0000 | 26.6779 | 45.0000 | 35.4234 |
| 6 | 6.0000 | 3.7325 | 16.0000 | 11.2936 | 26.0000 | 19.1988 | 36.0000 | 27.5350 | 46.0000 | 36.3314 |
| 7 | 7.0000 | 4.4736 | 17.0000 | 12.0639 | 27.0000 | 20.0140 | 37.0000 | 28.3889 | 47.0000 | 37.2357 |
| 8 | 8.0000 | 5.2230 | 18.0000 | 12.8412 | 28.0000 | 20.8363 | 38.0000 | 29.2491 | 48.0000 | 38.1547 |
| 9 | 9.0000 | 5.9701 | 19.0000 | 13.6279 | 29.0000 | 21.6558 | 39.0000 | 30.1157 | 49.0000 | 39.0698 |
| 10 | 10.0000 | 6.7151 | 20.0000 | 14.4113 | 30.0000 | 22.4823 | 40.0000 | 30.9885 | 50.0000 | 39.9994 |

| Range of C plate dot area % | 51.00%–60.00% | | 61.00–70.00% | | 71.00–80.00% | | 81.00–90.00% | | 91.00%–95.00 | |
|---|---|---|---|---|---|---|---|---|---|---|
| Plate type | C | M, Y | C | M, Y | C | M, Y | C | M, Y | C | M, Y |
| 1 | 51.0000 | 49.9341 | 61.0000 | 50.5926 | 71.0000 | 60.9857 | 81.0000 | 72.2530 | 91.0000 | 84.6464 |
| 2 | 52.0000 | 41.8648 | 62.0000 | 51.6025 | 72.0000 | 62.0680 | 82.0000 | 73.4365 | 92.0000 | 85.9589 |
| 3 | 53.0000 | 42.8094 | 63.0000 | 52.6078 | 73.0000 | 63.1608 | 83.0000 | 74.6335 | 93.0000 | 87.2900 |
| 4 | 54.0000 | 43.7589 | 64.0000 | 53.6336 | 74.0000 | 64.2634 | 84.0000 | 75.8390 | 94.0000 | 88.6319 |
| 5 | 55.0000 | 44.7220 | 65.0000 | 54.6543 | 75.0000 | 65.3760 | 85.0000 | 77.0592 | 95.0000 | 89.9915 |
| 6 | 56.0000 | 45.6808 | 66.0000 | 55.6869 | 76.0000 | 66.4982 | 86.0000 | 78.2938 | — | — |
| 7 | 57.0000 | 46.6530 | 67.0000 | 56.7310 | 77.0000 | 67.6298 | 87.0000 | 79.5349 | — | — |
| 8 | 58.0000 | 47.6295 | 68.0000 | 57.7865 | 78.0000 | 68.7706 | 88.0000 | 80.7971 | — | — |
| 9 | 59.0000 | 48.6102 | 69.0000 | 58.8447 | 79.0000 | 69.9202 | 89.0000 | 82.0651 | — | — |
| 10 | 60.0000 | 49.6037 | 70.0000 | 59.9057 | 80.0000 | 71.0785 | 90.0000 | 83.3532 | — | — |

TABLE 13

Color-separation Set-up Data for Color Original of K

| | $y_{Hn}$ | Middle tone | $y_{Sn}$ | $\gamma_n$ |
|---|---|---|---|---|
| For C plate | 21.7226 | 50.0063 | 90.2582 | 0.3548 |
| For M plate | 15.7721 | 40.0050 | 83.6871 | 0.1422 |
| For Y plate | 15.7721 | 40.0050 | 83.6871 | 0.1422 |

Note:
The conventional technique was adopted to the BL plate.

Before carrying out an actual color-separation work, a dot arrangement of a picture of the C plate which would be resulted from the color-separation of the color-original of K under the above set-up conditions was compared with that of the standard color-original. The results are shown in Table 14.

TABLE 14

Comparison of dot area % values of the C plate between standard color-original and color-original of K

| Density value | Light intensity value | Standard color-original | Color-original of K | difference |
|---|---|---|---|---|
| 1.00 | 1.3900 | 54.0437 | 54.0448 | +0.0011 |
| 2.50 | 1.7000 | 17.1767 | 17.1787 | +0.0020 |
| 2.00 | 1.9200 | 81.3283 | 81.3309 | +0.0026 |

It was verified by the results shown in Table 14 that the both halftone pictures are substantially the same.

In a next step, the color-original of K was color-separated by Magnascan M-645 (tradenamed: manufactured by Crosfield) and a resulting picture was evaluated by way of color proofing by means of Chromarine Proof Press (tradename: manufactured by DuPont).

As a result, the standard color-original (reference photographic original picture), needless to say, and the original-picture of K (individual photographic picture) both had tones of their entire pictures felt natural to human visual sensation. The reproduced printed pictures were quite satisfactory, in conclusion.

According to the present invention, the same result was yielded in another experiments. It was also ascertained that, in a stage of plate-making, a tone of a reproduced color printed picture was capable of being adjusted and controlled by numerical computation in the manner above described, besides rationally varied by appropriately changing H and S parts, and further a $Y_n$ value, adding the sense thereto.

What is claimed is:
1. A tonal conversion method comprising:
   determining a value $\gamma_o$ as a variable $\gamma_n$ in a tonal conversion formula so as to define a reference tonal conversion curve ($y_o$) which can be used to obtain a picture of a desired tone from a reference photographic original picture having density values ranging from a highlight H part density value $D_{Ho}$ to a shadow S part density value $D_{So}$, the reference tonal conversion curve ($y_o$) being defined by tonal conversion intensity values ($y_n$) of the tonal conversion formula using the value $\gamma_o$ as the variable $\gamma_n$ and light intensity values $X_{Ho}$ and $X_{So}$ converted from the corresponding density values $D_{Ho}$ and $D_{So}$;
   determining a value of the variable $\gamma_n$ in the tonal conversion formula based on the following formula,

$$\gamma_n = (\gamma_o) \times (X_{Hn} - X_{XSn})/(X_{Ho} - X_{So}))$$

so as to define an individual tonal conversion curve ($y_n$) of an individual photographic original picture having a density value range $D_{Hn}$ to $D_{Sn}$ which falls within the density value range of $D_{So}$ to $D_{Sn}$, the individual tonal conversion curve ($y_n$) being defined by tonal conversion intensity values ($y_n$) of the tonal conversion formula using the determined value of the variable $Y_n$ and light intensity values $X_{Hn}$ and $X_{Sn}$ converted from the corresponding density values $D_{Hn}$ and $D_{Sn}$;

viewing a photographic original picture with a scanner to measure a density $D_n$ of each pixel of the photographic original picture and to generate a corresponding first halftone representation of the photographic original picture; and tonal converting the first halftone representation of the photographic original picture into a tonal converted second halftone representation of the photographic original picture, said tonal converting step including, (a) converting the density $D_n$ of each pixel of the photographic original picture into a corresponding light intensity $X_n$ of each pixel based on a photographic density characteristic curve of the photographic original picture expressed in a D-X orthogonal coordinate system in which a D-axis denotes density values and an X-axis denotes light intensity values, (b) determining a tonal conversion intensity value ($y_n$) for each pixel from the light intensity $X_n$ of each pixel and from the determined value of the variable $\gamma_n$ and the light intensity values $X_{Hn}$ and $X_{Sn}$ using the tonal conversion formula, and, (c) generating the tonal converted second halftone representation of the photographic original picture based on the determined tonal conversion intensity value ($y_n$) for each pixel, wherein the tonal conversion formula is represented as follows, $$y_n = y_{Hn} + \frac{\alpha(1 - 10^{-\gamma_n \cdot \frac{X_n}{X_{Sn} - X_{Hn}}})}{\alpha - \beta} \cdot (y_{Sn} - y_{Hn})$$

where n: becoming n when applied to the individual photographic original picture, while becoming 0 when applied to the reference photographic original picture;

$X_n$: showing a basic light intensity information value ($X_n = X_{n'} - X_{Hn}$) determined by subtracting the light intensity information value ($X_{Hn}$) of a corresponding pixel, which value ($X_{Hn}$) is determined from the density information value ($D_{Hn}$) of the brightest (H) part of the photographic original picture via the photographic density characteristic curve, from the light intensity information value ($X_{n'}$) of a corresponding pixel from the density information value ($D_n$) of an arbitrary pixel on the photographic original picture by making use of the photographic density characteristic curve:

$X_{Sn}$, $X_{Hn}$: light intensity information values ($X_{Sn}$, $X_{Hn}$) of corresponding pixels determined from the density information values ($D_{Sn}$, $D_{Hn}$) of the darkest (S) and brightest (H) parts on the photographic original picture via the photographic characteristic curve, respectively;

$y_n$: (of the reference or individual) a tonal intensity value preset to a pixel on a reproduced picture corresponding to an arbitrary pixel on the photographic original picture;

$y_{Hn}$: (of the reference or individual) a tonal intensity value preset to the brightest (H) part on the photographic original picture;

$Y_{Sn}$: (of the reference or individual) a tonal intensity value preset to the darkest (S) part on the photographic original picture;

$\alpha$: a surface reflectance of a printed paper used to express a printed picture;

$\beta$: a value determined by $\beta = 10^{-Tn}$; and $\gamma_n$: an arbitrary coefficient.

2. A method according to claim 1, wherein the photographic original picture Is a positive type.

3. A method according to claim 1, wherein the photographic original picture is a negative type.

4. A method according to claim 1, wherein the photographic original picture is multicolored.

5. A method according to claim 1, wherein the photographic original picture is monochromatic.

6. A method according to claim 1, wherein the photographic original picture is of a transparent type.

7. A method according to claim 1, wherein the photographic original picture is of a reflection type.

8. A method according to claim 1, wherein the said method is applied to a picture information processing system.

* * * * *